(12) United States Patent
Rosenberg et al.

(10) Patent No.: US 8,634,316 B2
(45) Date of Patent: Jan. 21, 2014

(54) METHODS AND APPARATUS TO UTILIZE ROUTE AGGREGATION FOR EXCHANGING ROUTES IN A COMMUNICATION NETWORK

(75) Inventors: Eric Rosenberg, Lincroft, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 217 days.

(21) Appl. No.: 12/907,295

(22) Filed: Oct. 19, 2010

(65) Prior Publication Data

US 2012/0093166 A1 Apr. 19, 2012

(51) Int. Cl.
| | |
|---|---|
| G01R 31/08 | (2006.01) |
| G06F 11/00 | (2006.01) |
| G06F 15/173 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |

(52) U.S. Cl.
USPC ...... 370/252; 370/392; 370/395.31; 370/401; 709/238

(58) Field of Classification Search
USPC .............. 370/252, 392, 395.31, 401; 709/238
See application file for complete search history.

(56) References Cited

U.S. PATENT DOCUMENTS

| | | | |
|---|---|---|---|
| 6,392,997 B1 * | 5/2002 | Chen ............................. | 370/252 |
| 6,401,130 B1 | 6/2002 | Cain | |
| 6,954,459 B1 | 10/2005 | Vaidhyanathan et al. | |
| 7,599,313 B2 | 10/2009 | Patel et al. | |
| 7,675,912 B1 | 3/2010 | Ward et al. | |
| 2003/0179751 A1 * | 9/2003 | Omae et al. ................... | 370/392 |
| 2004/0006668 A1 * | 1/2004 | Park et al. ...................... | 711/108 |
| 2006/0164995 A1 * | 7/2006 | Djernaes et al. .............. | 370/238 |
| 2007/0260746 A1 * | 11/2007 | Mirtorabi et al. ............. | 709/238 |
| 2008/0049717 A1 * | 2/2008 | Jamieson et al. ............. | 370/351 |
| 2009/0003348 A1 * | 1/2009 | Kulkarni et al. .............. | 370/392 |
| 2009/0073994 A1 | 3/2009 | Qureshi et al. | |
| 2009/0103538 A1 * | 4/2009 | Yoshimi ........................ | 370/392 |
| 2010/0306574 A1 * | 12/2010 | Suzuki et al. ..................... | 714/4 |
| 2011/0058488 A1 * | 3/2011 | Watari et al. .................. | 370/245 |

\* cited by examiner

*Primary Examiner* — Alpus H Hsu
*Assistant Examiner* — Yee Lam
(74) *Attorney, Agent, or Firm* — Hanley, Flight & Zimmerman, LLC (57) ABSTRACT

Methods and apparatus to utilize route aggregation for exchanging routes in a communication network are disclosed. An example method to exchange routes in a communication network disclosed herein comprises aggregating a plurality of individual routes into an aggregate route characterized by an aggregate route identifier and a plurality of aggregate route parameter values, the plurality of individual routes comprising a respective plurality of individual route identifiers and respective pluralities of individual route parameter values, the aggregate route identifier to represent an aggregation of the plurality of individual route identifiers, the plurality of aggregate route parameter values to match at least some of the pluralities of individual route parameter values for at least some of the plurality of individual routes, and sending the aggregate route identifier and the plurality of aggregate route parameter values to a recipient in the communication network to forward the plurality of individual routes to the recipient.

18 Claims, 8 Drawing Sheets

METHODS AND APPARATUS TO UTILIZE ROUTE AGGREGATION FOR EXCHANGING ROUTES IN A COMMUNICATION NETWORK

FIELD OF THE DISCLOSURE

This disclosure relates generally to communication networks and, more particularly, to methods and apparatus to utilize route aggregation for exchanging routes in a communication network.

BACKGROUND

Many service provider networks employ a set of provider edge (PE) routers that define the provider side edge of the network. Each PE router interfaces with customer premises equipment (CPE) located at one or more customer sites served by the PE router. Service provider networks often provide virtual private network (VPN) services to interconnect different customer sites in a secure and private manner. To implement one or more VPNs between these customer sites, the PE routers communicatively coupled with the CPE at the different customer sites exchange routing information (also referred to as routes). Because each PE router can be connected to many CPE at many different customer sites, and each of these CPE can be part of a different VPN interconnecting with other CPE(s) at some other customer site(s), each PE router may support multiple VPNs and potentially need to communicate routes to any of the other PE routers in the service provider network. In smaller networks, a full mesh of PE routers is implemented to enable any PE router to exchange routes with any other PE router in the network. However, because full mesh implementations may not scale well, larger networks often employ route reflectors to exchange routes between PE routers.

In at least some service provider networks, a route reflector connects to the PE routers in the service provider network using interior border gateway protocol (iBGP) sessions. Each PE router uses iBGP to send routes to the route reflector for each VPN supported by the PE router. Additionally, each PE router uses iBGP to receive via the route reflector the routes from other PE routers in the network for each VPN the PE router supports. In an iBGP implementation, a route is a collection of objects, including a prefix and a set of route parameters, and a typical route reflector can maintain hundreds of thousands, or even millions, of routes.

DETAILED DESCRIPTION

Methods and apparatus to utilize route aggregation for exchanging routes in a communication network are disclosed herein. To this end, an example method disclosed herein for exchanging routes in a communication network involves aggregating a group of individual routes into an aggregate route characterized by an aggregate route identifier and a set of aggregate route parameter values. In some examples, each individual route in the group of individual routes comprises a respective individual route identifier and a respective set of individual route parameter values. In such examples, the aggregate route identifier represents an aggregation of (e.g., or subsumes, covers, etc.) the group of individual route identifiers associated with the respective group of individual routes, and the set of aggregate route parameter values are selected to match at least some of the sets of individual route parameter values for at least some of the individual routes.

For example, each individual route identifier can correspond to a border gateway protocol (BGP) route prefix representing a collection of destination Internet protocol (IP) addresses supported by the respective route. In such an example, the aggregate route identifier can correspond to an aggregate route prefix comprising a set of higher-order bits common to the individual route prefixes associated with the group of individual routes to be exchanged. Furthermore, the route parameters can correspond to BGP route objects, such as BGP attributes, metrics, etc.

To forward the group of individual routes to a recipient (e.g., a route reflector or a PE router) in the communication network, the example method further involves sending the aggregate route identifier and the set of aggregate route parameter values to the recipient (e.g., instead of sending each individual route identifier and each set of individual route parameter values separately). For example, the aggregate route identifier and the set of aggregate route parameter values can be sent as one or more attributes of one or more BGP update messages.

In some examples, the method also involves determining an absentee list and/or an exception matrix to further characterize an aggregate route used to represent a plurality of individual routes to be exchanged with (e.g., forwarded to) a recipient. An example absentee list specifies one or more individual route identifiers subsumed in the aggregate route identifier, but that should be disregarded (e.g., ignored or discarded) by the recipient (e.g., because these individual route identifier(s) do not correspond to actual route(s) to be forwarded to the recipient). An example exception matrix specifies one or more individual route identifiers for a respective one or more individual routes to be included in the aggregate route but having one or more individual route parameter values not included in (e.g., different from) the set of aggregate route parameter values. The exception matrix further specifies these one or more individual route parameter values not included in (e.g., different from) the plurality of aggregate route parameter values. In such examples, the absentee list and/or exception matrix are also sent (e.g., as one or more attributes of one or more BGP update messages) to forward the group of individual routes to the recipient.

In prior service provider networks, each route reflector and each PE router store each route separately and, thus, store a separate group of route parameter values (e.g., attributes or objects) for each customer (e.g., VPN) route. As noted above, a typical route reflector may need to maintain hundreds of thousands, or even millions, of routes. As such, prior route reflectors (as well as prior PE routers) can consume significant amounts of memory just to store all of these routes. Furthermore, because prior route forwarding techniques require each route and, thus, each route's parameters to be exchanged separately, prior route reflectors (as well as prior PE routers) can consume significant amounts of processor cycles just to exchange routes with recipients (such as other PE routers, other route reflectors, etc.).

Unlike such prior techniques, the example methods and apparatus described herein recognize that many routes have the same values for at least some of the different parameters (e.g., attributes or objects) describing the routes. Accordingly, the example methods and apparatus utilize an aggregate route to represent a group of individual routes having similar sets of values for their route parameters, thereby allowing one aggregate route to represent multiple individual routes. As such, a route reflector (or PE router), can store just a single aggregate route (e.g., corresponding to a single aggregate route identifier and a single set of aggregate route parameter values) to represent multiple individual routes, rather than storing the individual routes separately and, thus, storing separate sets of route parameter values for each of the individual routes. Additionally, the example methods and apparatus described herein can exchange a group of individual routes between a PE router and a route reflector (or vice versa) by exchanging just a single aggregate route, rather than exchanging each of the individual routes (and their respective sets of route parameter values) separately. Thus, in at least some examples, the methods and apparatus described herein can reduce the amount of memory used to store routes and/or reduce the amount of processor cycles used to exchange routes with recipients relative to prior route forwarding techniques.

Figure 1:
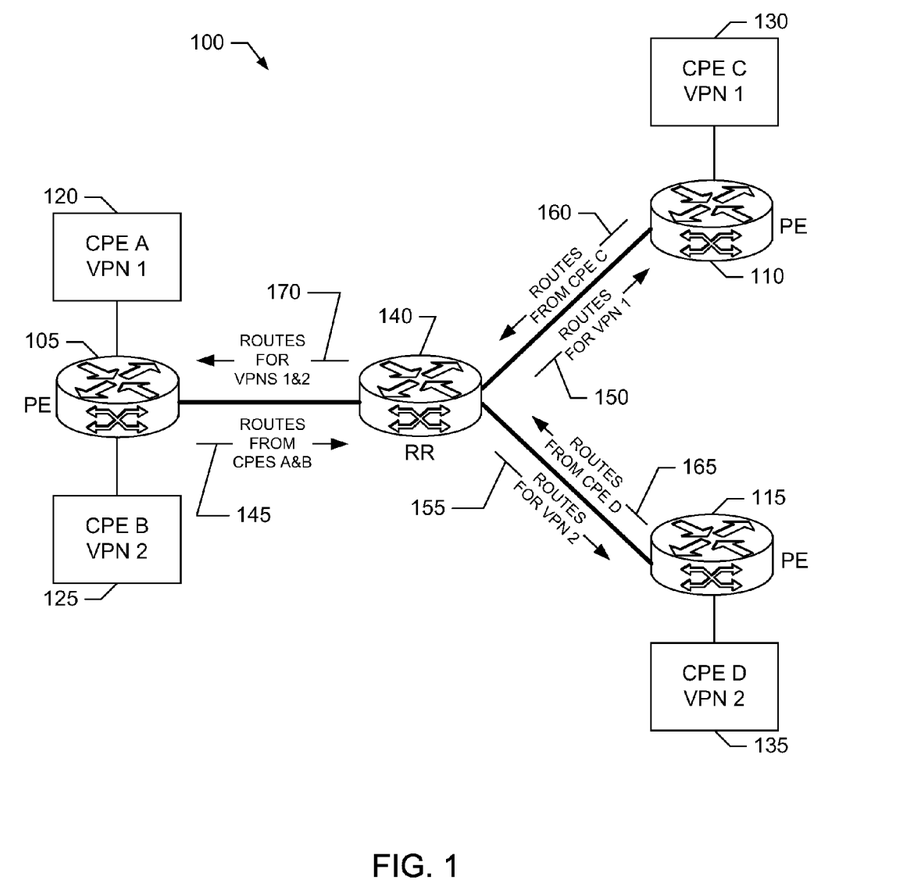
FIG. 1 is block diagram of an example service provider network in which route aggregation can be utilized to exchange routes in accordance with the methods and apparatus described herein.

Turning to the figures, a block diagram of an example service provider network 100 in which route aggregation can be utilized to exchange routes in accordance with the methods and apparatus described herein is illustrated in FIG. 1. The service provider network 100 includes example PE routers 105, 110 and 115 that define the provider side edge of the network 100. Each of PE routers 105, 110 and 115 may be implemented by any type or combination of one or more routers, switches, gateways, computers, etc., and/or one or more processing systems 900 illustrated in FIG. 9 and described in greater detail below. PE routers 105, 110 and 115 each enable example CPE 120, 125, 130 and 135 associated with (e.g., and possibly located at) one or more customer sites to interface with the service provider network 100. For example, PE router 105 communicatively couples CPE 120 and 125 to the network 100, PE router 110 communicatively couples CPE 130 to the network 100, and PE router 115 communicatively couples CPE 135 to the network 100. Each of the CPE 120, 125, 130 and 135 may be implemented by any type or combination of one or more routers, switches, gateways, computers, etc., and/or one or more processing systems 900 illustrated in FIG. 9 and described in greater detail below.

In the illustrated example, PE routers 105, 110 and 115 implement a first VPN (VPN 1) to interconnect CPE 120 and 130. PE routers 105, 110 and 115 also implement a second VPN (VPN 2) to interconnect CPE 125 and 135. To implement these VPNs, PE routers 105, 110 and 115 exchange routes defining the VPNs via an example route reflector 140 included in the service provider network 100. In particular, PE routers 105, 110 and 115 and the route reflector 140 employ the example method and/or apparatus described herein to utilize route aggregation to exchange routes in the network 100. The route reflector 140 may be implemented by any type or combination of one or more routers, switches, gateways, computers, etc., and/or one or more processing systems 900 illustrated in FIG. 9 and described in greater detail below.

For example, PE router 105 receives one or more routes for VPN 1 from CPE 120, and receives one or more routes for VPN 2 from CPE 125. Each route received from PE 120 and CPE 125 includes a route identifier identifying the route and a collection of route parameters (e.g., route objects, attributes, etc.) characterizing the route. PE router 105 forwards (or sends) the routes received from CPE 120 and 125 to the route reflector 140 via one or more route update messages 145. In some examples, the route update message(s) 145 are implemented as one or more BGP UPDATE messages. However, instead of forwarding each route received from CPE 120 and 125 separately, PE router 105 aggregates some or all of these routes into an aggregate route including an aggregate route identifier and a set of aggregate route parameters to be forwarded via the one or more route update messages 145. The aggregate route identifier subsumes, covers, etc., or otherwise aggregates the individual route identifiers associated with the individual routes to be forwarded. The set of aggregate route parameters are determined (e.g., selected) to match at least some of the sets of route parameters associated with the individual routes to be forwarded. Because the different, individual routes can have similar, or even identical, route parameter values (e.g., values of route objects, attributes, etc.), forwarding a single aggregate route having aggregate route parameter values similar, or identical, to each set of route parameter values for the individual routes, instead of forwarding each individual route separately, can potentially provide significant savings in the storage, processor cycles and/or communication bandwidth used to exchange routes in the network 100.

However, because one or more of the route parameter values for one or more of the individual routes to be forwarded by PE router 105 may be different from the respective value(s) in the set of aggregate route parameter values (e.g., and, thus, not included in the set of aggregate route parameter values), PE router 105 can determine an exception matrix to specify the individual route(s) having route parameter value(s) different from (or not included in) the set of aggregate route parameter values. Additionally or alternatively, because the aggregate route identifier may subsume, cover, etc. or otherwise include one or more individual route identifiers for individual routes that are not actually included in the group of individual routes to be forwarded, PE router 105 can determine an absentee list to specify those individual route identifiers that should be disregarded (e.g., ignored or discarded) by the recipient. If PE router 105 determines an absentee list and/or an exception matrix for the aggregate route, PE router 105 forwards the aggregate route to the route reflector 140 by sending the absentee list and/or exception matrix to the route reflector 140, along with the aggregate route identifier and set of aggregate route parameter values, via the one or more route update messages 145.

In the illustrated example, the route reflector 140 stores the routes received via the route update message(s) 145. Instead of storing each route separately and, thus, storing separate sets of route parameter values for each of the individual routes, the route reflector 140 can store just the received aggregate route, including the received aggregate route identifier, the received set of aggregate route parameter values, the received absentee list (if present) and the received exception matrix (if present). When the route reflector 140 (or PE routers 105-115) uses an aggregate route to represent multiple individual routes, an individual route having an individual route identifier subsumed, covered, etc., by the aggregate route identifier is presumed to be characterized by the aggregate router parameter values unless the individual route's route identifier is included in the absentee list or the exception matrix for the aggregate route. If the individual route's route identifier is included in the absentee list, the individual route is deemed to not be associated with the aggregate route and, thus, is presumed to be stored elsewhere in memory. If the individual route's route identifier is included in the exception matrix, the individual route is presumed to be characterized by the aggregate router parameter values, except for those values specified in the exception matrix.

In the illustrated example, the route reflector 140 then forwards received routes for VPN 1 to PE router 110 via one or more route update messages 150 (e.g., which may be implemented as one or more BGP UPDATE messages). The route reflector 140 also forwards received routes for VPN 2 to PE router 115 via one or more route update messages 155 (e.g., which may be implemented as one or more BGP UPDATE messages). Similar to PE router 105, the route reflector 140 employs the example methods and/or apparatus described herein to utilize aggregate routes to forward (e.g., via the route update message(s) 150 and/or 155) at least some individual routes to the respective PEs 110 and 115, instead of forwarding these individual routes (and their associated sets of route parameter values) separately.

In a similar manner, PE router 110 receives one or more routes for VPN 1 from CPE 130, and creates and forwards aggregate route(s) aggregating at least some of these routes to the route reflector 140 via one or more route update messages 160 (e.g., implemented as one or more BGP UPDATE messages). Similarly, PE router 115 receives one or more routes for VPN 2 from CPE 135, and creates and forwards aggregate route(s) aggregating at least some of these routes to the route reflector 140 via one or more route update messages 165 (e.g., implemented as one or more BGP UPDATE messages). The route reflector 140, in turn, creates and forwards aggregate route(s) aggregating at least some of these routes for VPN 1 and VPN 2 to PE router 105 via one or more route update messages 170 (e.g., implemented as one or more BGP UPDATE messages).

Although the service provider network 100 of the illustrated example includes three PE routers, one route reflector and four CPE, the methods and apparatus described herein can be used in networks having any numbers of PE routers, route reflectors and CPE. Additionally, in some examples, PE routers 105-115 interface with a second route reflector (not shown) in addition to the route reflector 140. For example, such a second route reflector could be used to configure one or more "brick walls" by associating each route reflector with a different routing plane and then restricting the forwarding of routes from one or more of PE routers 105-115 to only one of these routing planes. For example, PE router 105 could be configured to listen for routes on a first routing plane associated with the route reflector 140 and a second routing plane associated with the second route reflector (not shown), but to advertise (e.g., forward) received routes on only the first routing plane associated with the route reflector 140. Other brick walls could be configured for PE routers 110 and/or 115.

As described above, the route update messages 145-170 can be implemented as BGP UPDATE messages. In such examples, each route (e.g., individual or aggregate) being exchanged corresponds to a route in which the route identifier (e.g., individual or aggregate) corresponds to a route prefix (e.g., which can be an address and an associated mask) representing a collection of destination IP addresses supported by the route, and the route parameters (e.g., individual or aggregate) correspond to BGP route objects. Examples of BGP route objects include, but are not limited to, a BGP next hop (e.g., identifying the router that is the next hop towards the destination(s) represented by the route prefix), a path (e.g., AS_PATH) attribute (e.g., identifying the autonomous system(s) through which the routing information included in the UPDATE message has passed), a MULTI-EXIT-DIS-CRIMINATOR (MED) attribute (e.g., to discriminate among multiple access points to a neighboring autonomous system), a LOCAL_PREF (or LocPrf) attribute (e.g., representing a local preference for the advertised route), a metric (e.g., representing a cost associated with the route to be used for traffic engineering), a weight (e.g., a vendor-specific parameter associated with the route), etc. In such examples, values for these route objects are used to characterize each route (e.g., individual or aggregate).

Furthermore, although at least some of the preceding examples of utilizing route aggregation to exchange routes in the service provider network 100 have been described in the context of implementation via the BGP protocol, the example methods, apparatus and articles of manufacture described herein are not limited thereto. For example, the methods, apparatus and articles of manufacture described herein can be used to exchange routing information (e.g., attributes, parameters, etc.) in the context of other types of communication protocols, such as, but not limited to, the open shortest path first (OSPF) protocol, the intermediate system to intermediate system (IS-IS) protocol, the enhanced interior gateway routing protocol (EIGRP), etc.

Figure 2:
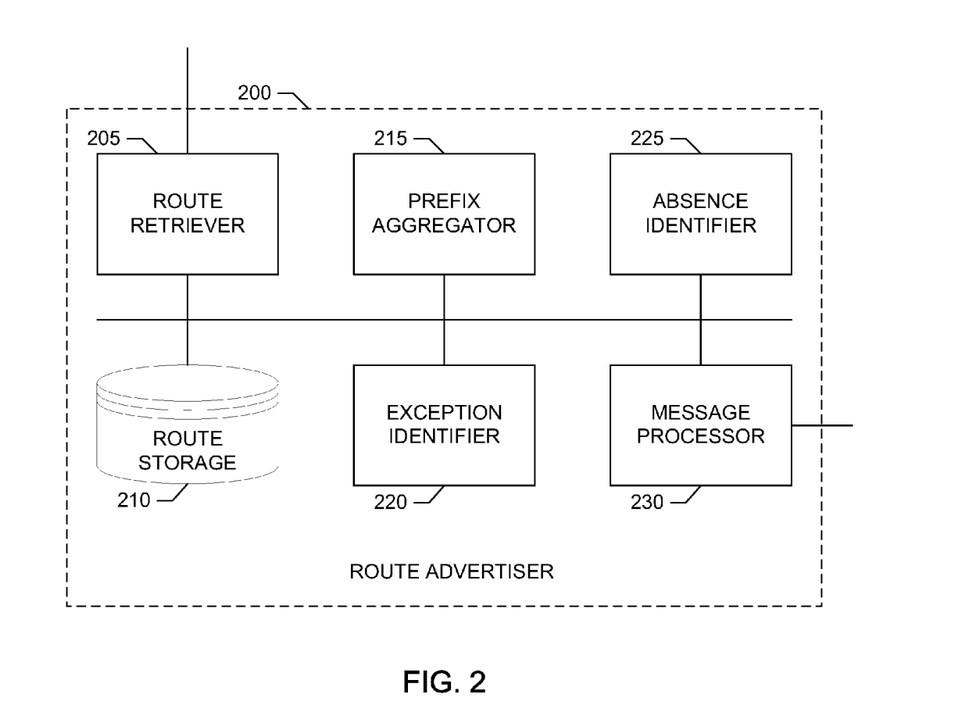
FIG. 2 is a block diagram of an example route advertiser that may be used to implement an example PE router and/or an example route reflector in the service provider network of FIG. 1.

An example route advertiser 200 that may be used to implement one or more of PE routers 105-115 and/or the route reflector 140 of FIG. 1 to perform route aggregation for exchanging routes in the service provider network 100 is illustrated in FIG. 2. The route advertiser 200 of the illustrated example includes an example route retriever 205 to retrieve a route to be forwarded to a route reflector, such as the route reflector 140, or to a PE router, such as PE router 105. In the illustrated example, the route retriever 205 retrieves the route from an example route storage 210. For example, if the route advertiser 200 is used to implement PE router 105, then the route may correspond to a route previously received from CPE 120 or CPE 125 and stored in the route storage 210. As another example, if the route advertiser 200 is used to implement the route reflector 140, then the route may correspond to a route previously received from one of PE routers 105-115 and stored in the route storage 210.

The route storage 210 may be implemented using any type of memory or storage, such as the volatile memory 918 and/or the mass storage device 930 of FIG. 9, which is described in greater detail below. For each individual route received by the route advertiser 200, the route storage 210 initially stores an individual route identifier and a set of individual route parameter values. If an individual route is later included in an aggregate route, the individual route's route identifier and set of route parameter values may then be deleted (as described in greater detail below), as such an individual route will be represented by the aggregate route.

To determine an aggregate route to represent a group of individual routes, the route advertiser 200 includes an example prefix aggregator 215, an example exception identifier 220 and an example absence identifier 225. The prefix aggregator 215 determines an aggregate route identifier, such as an aggregate route prefix, for the aggregate route. The aggregate route identifier (e.g., prefix) determined by the prefix aggregator 215 subsumes, covers, etc., or otherwise represents an aggregation of the group of individual route identifiers (e.g., prefixes) associated with the respective group of individual routes being aggregated. For example, if the individual routes being aggregated correspond to BGP routes, then the route identifiers correspond to route prefixes. In such an example, the prefix aggregator 215 determines an aggregate route prefix to be a prefix having a set of higher-order (e.g., most significant) bits that are shared among the individual route prefixes associated with the group of individual routes being aggregated. The prefix aggregator 215 also determines a set of aggregate route parameter values matching some, if not all, of the respective sets of route parameter values for the individual routes being aggregated.

Figure 3:
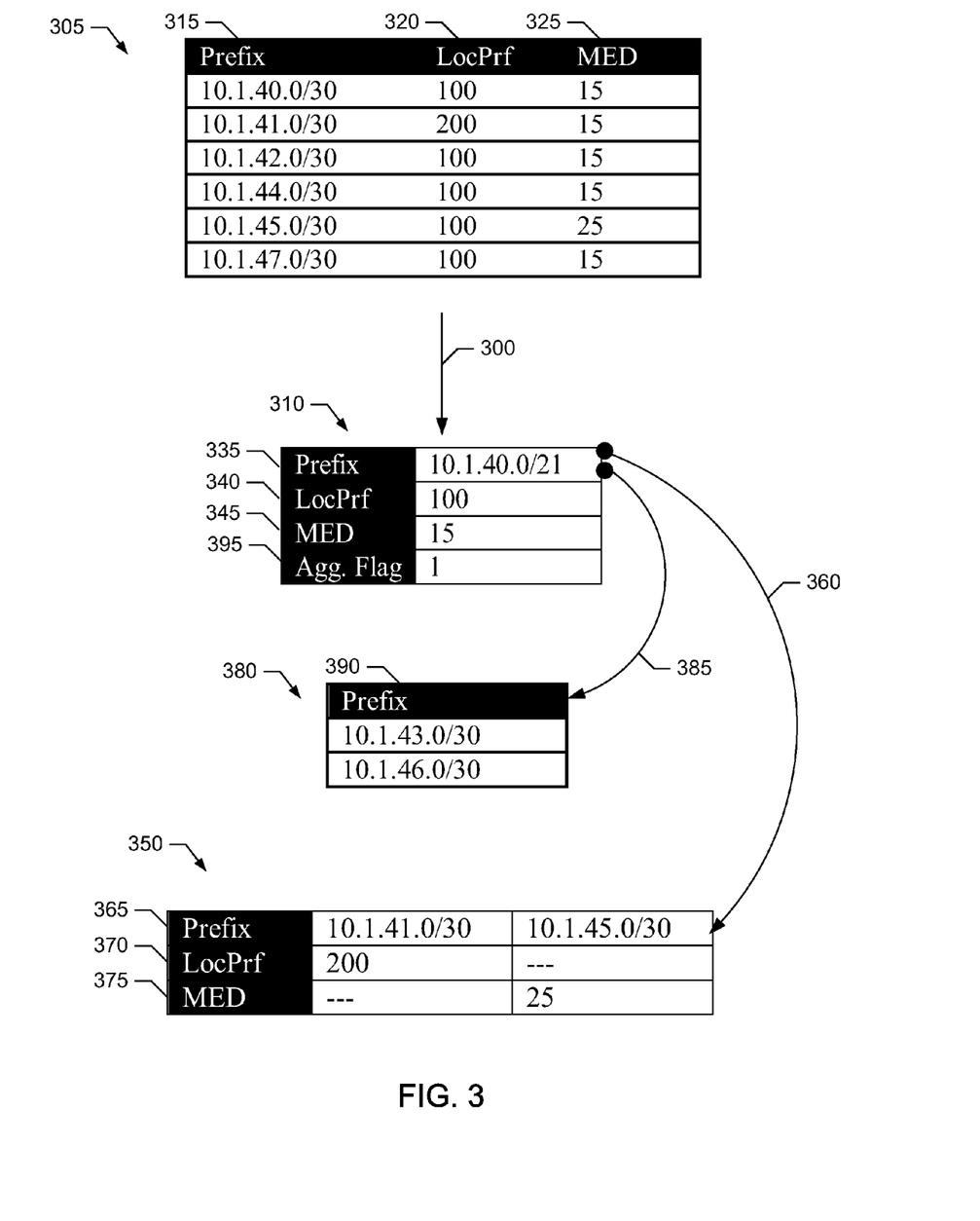
FIG. 3 illustrates a first example operation of the route advertiser of FIG. 2 to perform route aggregation on a first set of routes to be advertised in the service provider network of FIG. 1.

An example route aggregation operation 300 performed by the route advertiser 200 which further illustrates operation of the prefix aggregator 215 is illustrated in FIG. 3. Turning to FIG. 3, a group of individual BGP routes 305 are to be aggregated by the route advertiser 200 into an aggregate BGP route specified by an aggregate route matrix 310. Accordingly, each individual BGP route 305 of the illustrated example includes a respective route prefix 315 and a respective set of values for the route parameters 320 and 325. In the illustrated example, the route parameter 320 corresponds to a LOCAL_PREF (or LocPrf) attribute 320, and the route parameter 325 corresponds to an MED attribute 325.

To aggregate the individual BGP routes 305 into the aggregate BGP route specified by the route matrix 310, the route advertiser 200 performs the aggregation operation 300 (represented by a directed line 300), which includes the prefix aggregator 215 determining an aggregate prefix 335 representative of (e.g., subsuming, covering, etc.) the group of individual prefixes 315 for the individual BGP routes 305 being aggregated. For example, in FIG. 3, the individual prefixes 315 for the individual BGP routes 305 are 10.1.40.0/30, 10.1.41.0/30, 10.1.42.0/30, 10.1.44.0/30, 10.1.45.0/30 and 10.1.47.0/30, where each decimal number before the slash (/) corresponds to an eight (8) bit value ranging from 0 to 255 and, thus, a prefix includes 32 bits in total. In the illustrated example, the prefix aggregator 215 determines the aggregate prefix 335 to be the set of higher-order (or most significant) bits that are common to (or shared among or the same among) the individual prefixes 315. Accordingly, in FIG. 3 the prefix aggregator 215 determines the aggregate prefix 335 to be the set of the higher-order bits common to the individual prefixes 10.1.40.0/30, 10.1.41.0/30, 10.1.42.0/30, 10.1.44.0/30, 10.1.45.0/30 and 10.1.47.0/30. Because the most significant 21 bits of each of the individual prefixes 315 are the same in the illustrated example, the prefix aggregator 215 determines the aggregate prefix 335 to be 10.1.40.0/21, where "/21" indicates that the higher-order 21 bits specify the bits of the aggregate prefix to be used (e.g., that are significant), and "10.1.40.0" corresponds to the values of these bits that are common to all of the individual route prefixes 315 represented by the aggregate prefix 335.

As part of the aggregation operation 300, the prefix aggregator 215 also determines a set of values for the aggregate route parameters 340 and 345 that match some (e.g., a majority) or all of the set of values for the route parameters 320 and 325 of the individual routes 305 being aggregated. In the illustrated example, the LocPrf attribute 320 has a value of 100 for most of the individual routes 305 being aggregated, and the MED attribute 325 has a value of 15 for most of the individual routes 305 being aggregated. Accordingly, the prefix aggregator 215 determines the aggregate route parameter 340 to be an aggregate LocPrf attribute 340 having a value of 100. Similarly, the prefix aggregator 215 determines the aggregate route parameter 345 to be a MED attribute 345 having a value of 15.

Returning to FIG. 2, the route advertiser 200 includes the exception identifier 220 to determine an exception matrix that identifies any individual routes subsumed in the aggregate route determined by the prefix aggregator 215 but that have one or more individual route parameter values different from the corresponding aggregate route parameter values characterizing the aggregate route. The exception matrix determined by the exception identifier 220 also identifies the particular values of these route parameters which differ from the corresponding aggregate route parameter values.

For example, with reference to the aggregation operation 300 illustrated in FIG. 3, the individual route having a route prefix 315 of 10.1.41.0/30 has a value of 200 for the LocPrf attribute 320, which differs from the value of 100 for the aggregate LocPrf attribute 340. Additionally, the individual route having a route prefix 315 of 10.1.45.0/30 has a value of 25 for the MED attribute 325, which differs from the value of 15 for the aggregate MED attribute 345. Accordingly, as part of the aggregation operation 300, the exception identifier 220 determines an exception matrix 350 linked or otherwise associated with the aggregate route matrix 310 (e.g., with such linking represented in FIG. 3 by a directed line 360). The exception matrix 350 includes a listing of route prefixes 365 for the routes having route parameter values not included in (e.g., different from) the aggregate route parameters of the aggregate route matrix 310. The exception matrix 350 also includes these particular values of the route parameters 370-375 which differ from the corresponding aggregate route parameter values. For example, the exception matrix 350 includes a route prefix 365 of 10.1.41.0/30 with a LocPrf attribute 370 having a value of 200 to indicate how this route differs from the aggregate route matrix 310. The exception matrix 350 also includes a route prefix 365 of 10.1.45.0/30 with an MED attribute 375 having a value of 25 to indicate how this route differs from the aggregate route matrix 310.

Returning to FIG. 2, the route advertiser 200 includes the absentee identifier 225 to determine an absentee list that identifies any individual route whose individual route identifier (e.g., prefixes) is subsumed, covered, etc., or otherwise represented by the aggregate route identifier (e.g., prefix) determined by the prefix aggregator 215, but that should be disregarded (e.g., ignored or discarded) by the recipient. For example, with reference to the aggregation operation 300 illustrated in FIG. 3, the 21 most significant (e.g., higher-order) bits of the individual route prefix values of 10.1.43.0/30 and 10.1.46.0/30 are the same as the aggregate route prefix 335. As such, the individual route prefix values of 10.1.43.0/30 and 10.1.46.0/30 are also subsumed or covered by the aggregate route prefix 335. However, no individual routes having prefix values of 10.1.43.0/30 and 10.1.46.0/30 are included in the group of individual routes 315 to be represented by the aggregate route specified by the route matrix 310. Accordingly, as part of the aggregation operation 300, the absentee identifier 225 determines an absentee list 380 linked or otherwise associated with the aggregate route matrix 310 (e.g., with such linking represented in FIG. 3 by a directed line 385). The absentee list 380 includes a listing of route prefixes 390 for the individual routes not to be represented by (e.g., included in) the aggregate route matrix 310. For example, the absentee list 380 includes route prefixes 390 of 10.1.43.0/30 and 10.1.46.0/30 to indicate that individual routes associated with these route prefixes are not included in the group of individual routes 305 represented by the aggregate route matrix 310.

Returning to FIG. 2, the route advertiser 200 includes an example message processor 230 to forward the aggregate route matrix (e.g., including the aggregate route prefix and the set of aggregate route parameter values) determined by the prefix aggregator 215, along with any exception matrix determined by the exception identifier 220 and/or any absentee list determined by the absentee identifier 225 for the aggregate route. In an example BGP implementation, the message processor 220 can send a BGP UPDATE message containing the aggregate route prefix for the route and one or more new message attributes representing the set of aggregate route parameter values, the exception matrix and/or the absentee list. Additionally or alternatively, one or more new messages may be defined and used by the message processor 220 for sending one or more of the aggregate route prefix, the aggregate route parameter values, the exception matrix and/or the absentee list to a recipient (e.g., one of PE routers 105-115 or the route reflector 140) in the service provider network 100.

Furthermore, the message processor 230 (or, alternatively, the prefix aggregator 215) sets an aggregation flag or other indicator to be associated and sent with the aggregate route to distinguish aggregate routes from individual (e.g., non-aggregate, conventional, etc.) routes. For example, with reference to the aggregation operation 300 of FIG. 3, an aggregation flag 395 is asserted to distinguish the aggregate route specified by the route matrix 310 from an individual (e.g., non-aggregate or conventional) route (e.g., such as one of the routes 305). In some example, the aggregation flag 395 is used to indicate to a recipient of the associated route whether to treat the route as an individual (e.g., non-aggregate or conventional) route or as an aggregate route created in accordance with the methods and apparatus described herein. For example, because aggregate and non-aggregate routes may be indistinguishable (e.g., especially if an aggregate route does not have an absentee list or an exception matrix), the recipient may determine that a received route is actually an aggregate route representing multiple individual routes if the aggregation flag included with the route is asserted.

Figure 4:
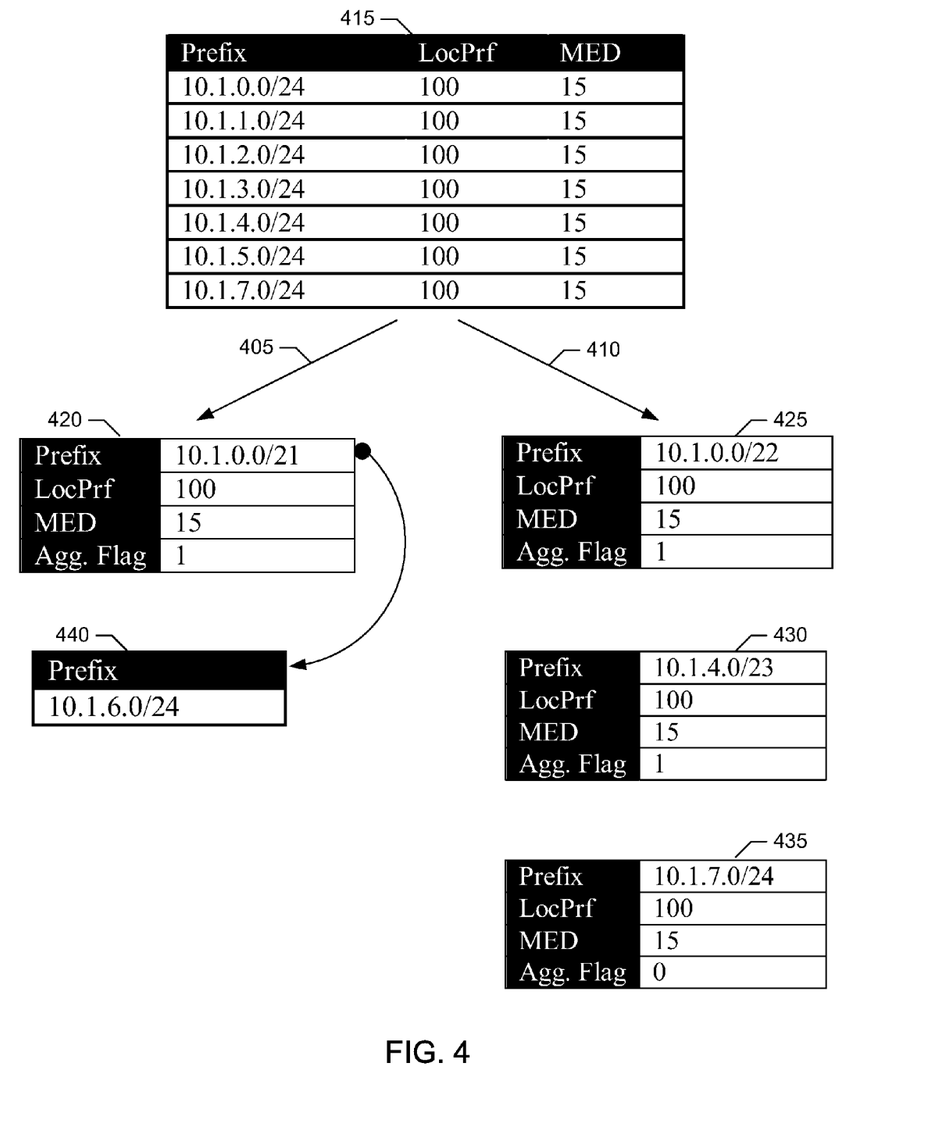
FIG. 4 illustrates second and third example operations of the route advertiser of FIG. 2 to perform route aggregation on a second set of routes to be advertised in the service provider network of FIG. 1.

FIG. 4 illustrates further example aggregation operations 405 and 410 that may be performed by the route advertiser 200. The examples of FIG. 4 illustrate different ways in which a group of individual routes 415 may be aggregated into, for example, a single aggregate route 420 or multiple routes 425, 430 and 435. In the examples of FIG. 4, the routes in the group of individual routes 415 have individual prefixes of 10.1.0.0/24 through 10.1.7.0/24, except for the prefix 10.1.6.0/24, and are to be aggregated by the route advertiser 200. In the first example aggregation operation 405, the route advertiser 200 has been configured to aggregate the group of individual routes 415 into, for example, as few aggregate routes as possible. As such, in the illustrated example the first aggregation operation 405 (e.g., performed by the route advertiser 200 as described above) produces the single aggregate route 420 having an aggregate prefix of 10.1.0.0/21, which corresponds to the 21 most significant (e.g., higher-order) bits common among all prefixes for the group of individual routes 415. Additionally, the first aggregation operation 405 determines an absentee list 440 to be linked with the aggregate route 420 to indicate that the individual route having the prefix 10.1.6.0/24, which is subsumed in the aggregate route prefix, is not to be included in the aggregate route 420.

In contrast with the first aggregation operation 405, in the second example aggregation operation 410 the route advertiser 200 has been configured to aggregate the group of individual routes 415 into, for example, aggregate routes without absentee lists (or without absentee lists and/or exception matrices, etc.). As such, in the illustrated example the second aggregation operation 410 (e.g., performed by the route advertiser 200 as described above) produces three (3) routes 425, 430 and 435 to represent the group of seven (7) individual routes 415. The first aggregate route 420 has an aggregate prefix of 10.1.0.0/22, which corresponds to the 22 most significant (e.g., higher-order) bits common among the first four prefixes in the group of individual routes 415 (i.e., 10.1.0.0/24 through 10.1.3.0/24). The second aggregate route 425 has an aggregate prefix of 10.1.4.0/23, which corresponds to the 23 most significant (e.g., higher-order) bits common among the next two prefixes in the group of individual routes 415 (i.e., 10.1.4.0/24 through 10.1.5.0/24). The third route 435 is not an aggregate route and, instead, is the individual route corresponding to the remaining prefix in the group of individual routes 415 (i.e., 10.1.7.0/24).

In some examples, it may be beneficial to aggregate individual routes into as few aggregate routes as possible (e.g., to reduce storage requirements by storing fewer aggregate routes). In such examples, configuring the route advertiser 200 to perform route aggregation similar to the first aggregation operation 405 may be desired. In other examples, it may be beneficial to aggregate individual routes into aggregate routes having no absentee lists, no exception matrices, or both (e.g., to reduce processing requirements by processing simpler aggregate routes). In such examples, configuring the route advertiser 200 to perform route aggregation similar to the second aggregation operation 405 may be desired.

Figure 5:
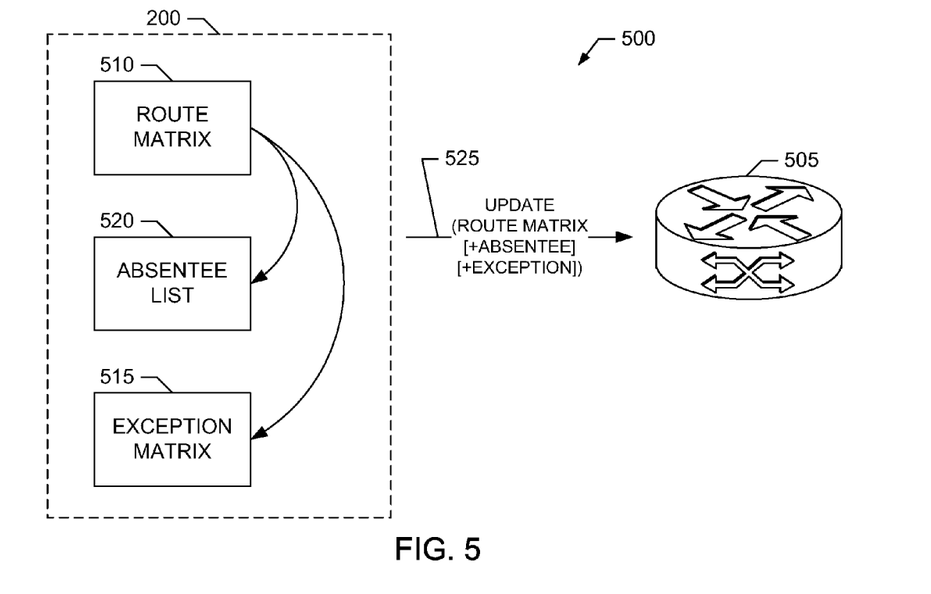
FIG. 5 illustrates an example operation in which the route advertiser of FIG. 2 utilizes route aggregation to exchange routes with an example recipient PE router or route reflector.

An example operation 500 of route advertiser 200 of FIG. 2 to forward (e.g., exchange) routes to an example recipient 505 in the service provider network 100 of FIG. 1 illustrated in FIG. 5. For example, if the route advertiser 200 is implemented in/by one of PE routers 105-115, then the recipient 505 can correspond to the route reflector 140. As another example, if the route advertiser 200 is implemented in/by the route reflector 140, then the recipient 505 can correspond to one of PE routers 105-115.

In the example operation 500, the route advertiser 200 is to forward an aggregate route to the recipient 505. The aggregate route includes (e.g., or is otherwise specified by) an aggregate route matrix 510 (e.g., similar to the aggregate route matrix 310), an optional exception matrix 515 (e.g., similar to the exception matrix 350) and an optional absentee list 520 (e.g., similar to the absentee list 380). In the illustrated example, the route advertiser 200 forwards the aggregate route to the recipient 505 using an update message 525 conveying the aggregate route matrix 510, the optional exception matrix 515 and the optional absentee list 520. For example, the update message 525 can correspond to one or more BGP UPDATE messages containing the aggregate prefix and attributes having the aggregate route parameter values specified in the route matrix 510, and one or more new UPDATE message attributes (and/or new messages) representing the optional exception matrix 515 and/or the optional absentee list 520.

While an example manner of implementing the route advertiser 200 has been illustrated in FIG. 2, one or more of the elements, processes and/or devices illustrated in FIG. 2 may be combined, divided, re-arranged, omitted, eliminated and/or implemented in any other way. Further, the example route retriever 205, the example route storage 210, the example prefix aggregator 215, the example exception identifier 220, the example absence identifier 225, the example message processor 230 and/or, more generally, the example route advertiser 200 of FIG. 2 may be implemented by hardware, software, firmware and/or any combination of hardware, software and/or firmware. Thus, for example, any of the example route retriever 205, the example route storage 210, the example prefix aggregator 215, the example exception identifier 220, the example absence identifier 225, the example message processor 230 and/or, more generally, the example route advertiser 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example route advertiser 200, the example route retriever 205, the example route storage 210, the example prefix aggregator 215, the example exception identifier 220, the example absence identifier 225 and/or the example message processor 230 are hereby expressly defined to include a tangible computer readable medium such as a memory, digital versatile disk (DVD), compact disk (CD), etc., storing such software and/or firmware. Further still, the example route advertiser 200 of FIG. 2 may include one or more elements, processes and/or devices in addition to, or instead of, those illustrated in FIG. 2, and/or may include more than one of any or all of the illustrated elements, processes and devices.

Figure 6:
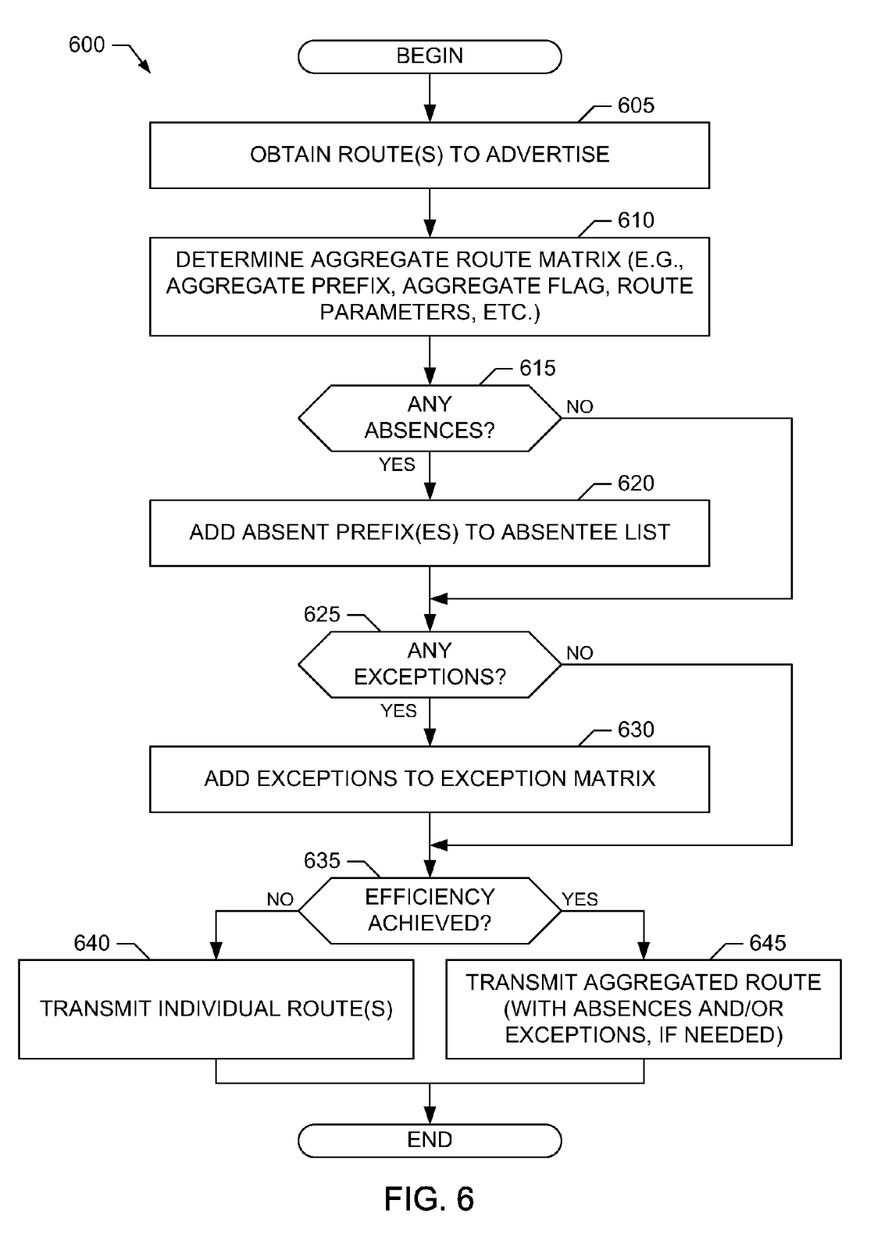
FIG. 6 is a flowchart representative of example machine readable instructions that may be executed to implement route forwarding in the route advertiser of FIG. 2.
Figure 7:
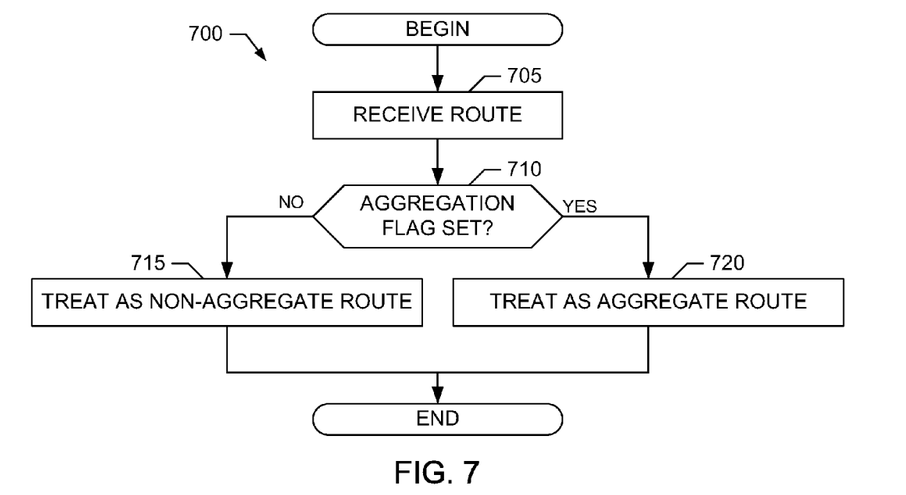
FIG. 7 is a flowchart representative of example machine readable instructions that may be executed to implement route reception in the route advertiser of FIG. 2.
Figure 8:
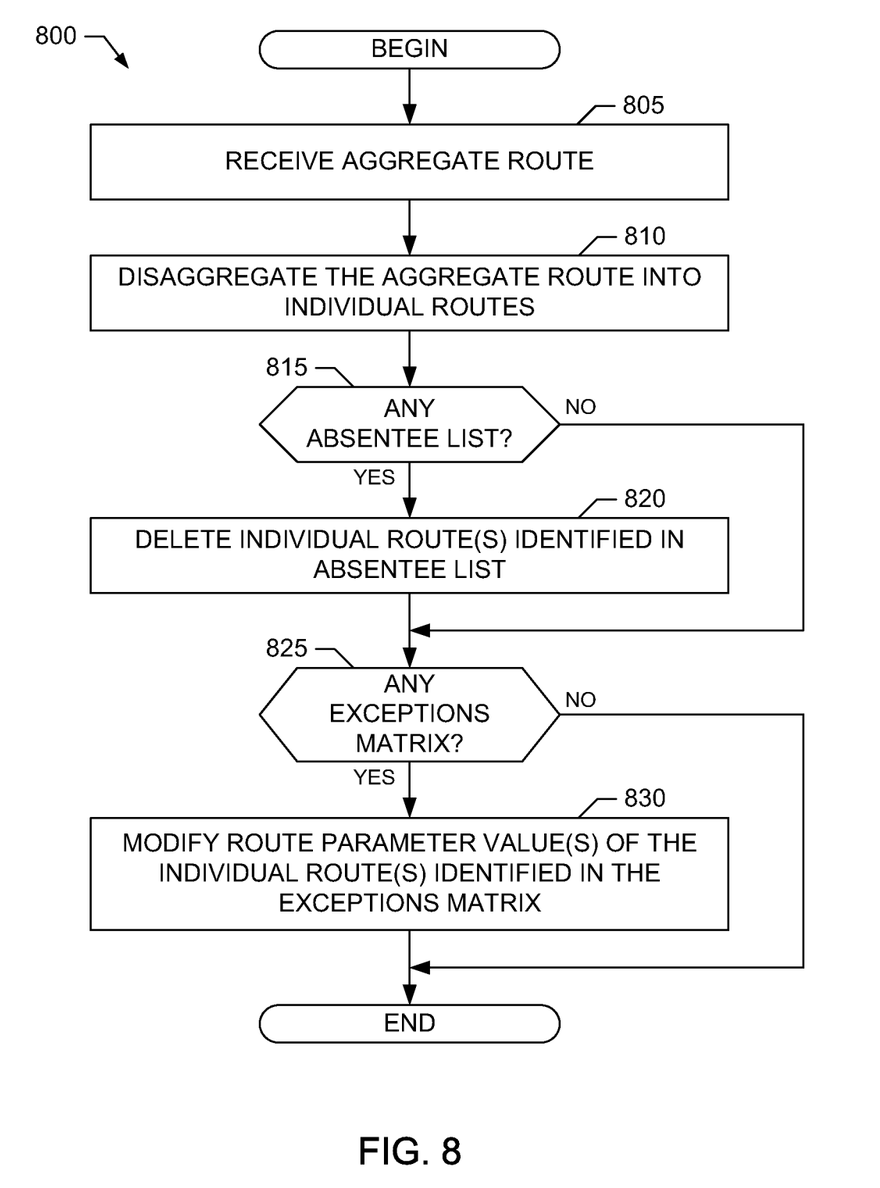
FIG. 8 is a flowchart representative of example machine readable instructions that may be executed to implement aggregate route disaggregation in the route advertiser of FIG. 2.

Flowcharts representative of example machine readable instructions that may be executed to implement example PE routers 105-115, the example route reflector 140, the example route advertiser 200, the example route retriever 205, the example route storage 210, the example prefix aggregator 215, the example exception identifier 220, the example absence identifier 225 and/or the example message processor 230 are shown in FIGS. 6-8. In these examples, the machine readable instructions represented by each flowchart may comprise one or more programs for execution by a processor, such as the processor 912 shown in the example processing system 900 discussed below in connection with FIG. 9. Alternatively, the entire program or programs and/or portions thereof implementing one or more of the processes represented by the flowcharts of FIGS. 6-8 could be executed by a device other than the processor 912 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-8 may be implemented manually. Further, although the example machine readable instructions are described with reference to the flowcharts illustrated in FIGS. 6-8, many other techniques for implementing the example methods and apparatus described herein may alternatively be used. For example, with reference to the flowcharts illustrated in FIGS. 6-8, the order of execution of the blocks may be changed, and/or some of the blocks described may be changed, eliminated, combined and/or subdivided into multiple blocks.

As mentioned above, the example processes of FIGS. 6-8 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-8 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 600 that may be executed to implement the route advertiser 200 of FIG. 2 (e.g., for use in implementing one or more of PE routers 105-115 and/or the route reflector 140 of FIG. 1) are represented by the flowchart shown in FIG. 6. The example machine readable instructions 600 perform route exchanging (e.g., also referred to as route forwarding, route advertising, etc.) and may be executed at predetermined intervals, based on an occurrence of a predetermined event, etc., or any combination thereof. With reference to the preceding figures, the machine readable instructions 600 of FIG. 6 begin execution at block 605 at which the route retriever 205 included in the route advertiser 200 obtains a group of routes to be forwarded to a recipient (such as the recipient 505) in the service provider network 100. For example, the route retriever 205 can retrieve the routes from the route storage 210 included in the route advertiser 200.

Next, at block 610 the prefix aggregator 215 included in the route advertiser 200 determines an aggregate route matrix (such as the route matrix 310) specifying an aggregate route representative of the group of routes obtained at block 605. For example, at block 610 the prefix aggregator 215 determines an aggregate route identifier, such as an aggregate route prefix, that subsumes, covers, etc., or otherwise represents an aggregation of the group of individual route identifiers (e.g., prefixes) associated with the group of routes obtained at block 605. Additionally, at block 610 the prefix aggregator 215 determines a set of aggregate route parameter values matching at least some of the respective sets of route parameter values for the routes obtained at block 605.

At block 615, the absentee identifier 225 included in the route advertiser 200 determines whether any route identifiers (e.g., prefixes) subsumed/covered by the aggregate route identifier (e.g., prefix) determined at block 610 correspond to routes that are not to be included in the aggregate route. If there are any such routes that are not to be included in the aggregate route (block 615), then at block 620 the absentee identifier 225 creates an absentee list (such as the absentee list 380) specifying the route identifier (e.g., prefix) for each such route that is not to be included in the aggregate route. The absentee identifier 225 also links the absentee list to the route matrix determined at block 610.

At block 625, the exception identifier 220 included in the route advertiser 200 determines whether any of the routes obtained at block 605 have route parameter values that differ from or, more generally, are not included in the set of aggregate route parameter values determined at block 610 for inclusion in the aggregate route matrix. If there are any such routes that have route parameter values that are not included in the set of aggregate route parameter values (block 625), then at block 630 the exception identifier 220 creates an exception matrix (such as the exception matrix 350) specifying the route identifier (e.g., prefix) for each such route, along with the route's route parameter value(s) that is(are) an exception from the set of aggregate route parameter values.

At block 635, the route advertiser 200 determines whether any efficiency has been achieved by aggregating the routes obtained at block 605 into the aggregate route represented by the route matrix determined at block 610 and any absentee list determined at block 620 and/or exception matrix determined at block 630. Such efficiency can be measured in terms of a reduction in memory and/or processing cycle requirements for exchanging the aggregate route relative to separately exchanging the routes represented by the aggregate route. For example, aggregating ten (10) routes into a single aggregate route having a relatively small absentee list and exception matrix may achieve such a processing efficiency, whereas aggregating two (2) routes into an aggregate route requiring both an absentee list and an exception matrix may not achieve a processing efficiency.

If no efficiency is achieved (block 635), then at block 640 the message processor 230 included in the route advertiser 200 sends each route obtained at block 605 separately to the intended recipient (e.g., using any appropriate route forwarding/advertising technique, and without setting any aggregation flag/indicator associated with each route). However, if an efficiency is achieved (block 635), then at block 645 the message processor 230 sends the aggregate route, instead of the separate routes obtained at block 605), to the intended recipient. For example, at block 645 the message processor 230 can send one or more route update messages (such as BGP UPDATE messages) conveying the contents of the route matrix determined at block 610, and any absentee list determined at block 620 and/or exception matrix determined at block 630. After processing at blocks 640 or 645 completes, execution of the example machine readable instructions 600 ends.

Example machine readable instructions 700 that may be executed to implement the route advertiser 200 of FIG. 2 (e.g., for use in implementing one or more of PE routers 105-115 and/or the route reflector 140 of FIG. 1) are represented by the flowchart shown in FIG. 7. The example machine readable instructions 700 are used to receive exchanged (e.g., forwarded or advertised) routes and may be executed at predetermined intervals, based on an occurrence of a predetermined event, etc., or any combination thereof. With reference to the preceding figures, the machine readable instructions 700 of FIG. 7 begin execution at block 705 at which the message processor 230 included in the route advertiser 200 receives one or more route update messages (such as BGP UPDATE messages) forwarding a route. At block 710, the message processor 230 determines whether an aggregation flag included with received route is set. If the aggregation flag is not set (block 710), then at block 715 the message processor 230 stores the received route as an individual (e.g., non-aggregated) route in the route storage 210 included in the route advertiser 200. However, if the aggregation flag is set (block 710), then at block 720 the message processor 230 stores the received route as an aggregate route in the route storage 210. In some examples, the message processor 230 stores the aggregation flag with the received route to indicate whether the route is an aggregate route or an individual (e.g., non-aggregate) route. After processing at blocks 715 or 720 completes, execution of the example machine readable instructions 700 ends.

In some examples, a recipient of an aggregate route (such as one of PE routers 105-115 or the route reflector 140 of FIG. 1) is configured to maintain the aggregate route in its compact form (e.g., represented by an aggregate route matrix and any absentee list and/or exception matrix) for subsequent route processing, forwarding, etc. Additionally or alternatively, in some examples a recipient of an aggregate route (such as one of PE routers 105-115 or the route reflector 140 of FIG. 1) is configured to disaggregate the received aggregate route into the individual routes represented by the aggregate route for subsequent route processing, forwarding, etc. For example, if PE router 110 is the recipient of an aggregate route, then based on negotiated routing capabilities exchanged between PE router 110 and CPE 130, PE router 110 may maintain the received aggregate route in its compact form or disaggregate the aggregate route into the individual routes represented by the aggregate route depending upon which form of forwarded routing information CPE 120 can accept.

Example machine readable instructions 800 that may be executed to implement such disaggregation of aggregate routes in the route advertiser 200 of FIG. 2 (e.g., for use in implementing one or more of PE routers 105-115 and/or the route reflector 140 of FIG. 1) are represented by the flowchart shown in FIG. 8. The example machine readable instructions 800 may be executed at predetermined intervals, based on an occurrence of a predetermined event, etc., or any combination thereof. With reference to the preceding figures, the machine readable instructions 800 of FIG. 8 begin execution at block 805 at which the route advertiser 200 receives an aggregate route (e.g., which may correspond to an aggregate route obtained and stored at block 720 of FIG. 7). At block 810, the route advertiser 200 disaggregates the received aggregate route into separate, individual routes, where each individual route corresponds to a different individual route identifier subsumed by the aggregate route prefix. In the illustrated example, the individual routes determined at block 810 from the aggregate route are characterized by route parameter values matching the aggregate route parameter values.

At block 815, the route advertiser 200 determines whether an absentee list is included with the aggregate route received at block 805. If an absentee list is present (block 815), then at block 820 the route advertiser 200 deletes the disaggregated individual route(s) that are identified in the absentee list (e.g., because the absentee list indicates that such individual route(s) are to be disregarded by the recipient). At block 825, the route advertiser 200 determines whether an exception matrix is included with the aggregate route received at block 805. If an exception matrix is present (block 825), then at block 830 the route advertiser 200 modifies the route parameter value(s) of the disaggregated individual route(s) that are identified in the exception matrix. For example, for each disaggregated individual route identified in the exception matrix, the route advertiser 200 modifies the route parameter value(s) of this disaggregated individual route to have the route parameter value(s) specified in the exception matrix. After processing at block 830 completes, execution of the example machine readable instructions 800 ends.

Although the preceding examples have been directed to aggregating a group of individual routes into an aggregate route, the example route aggregation methods and apparatus described herein are not limited thereto. For example, the example methods and apparatus disclosed herein can be used to aggregate multiple, aggregate routes into yet another aggregate route, or to aggregate individual and aggregate routes into yet another aggregate route, etc.

In some examples, one or more of the example methods and/or apparatus disclosed herein can be combined with one or more of the example methods and/or apparatus disclosed in U.S. patent application Ser. No. 12/907,232, which also corresponds to U.S. Patent Publication No. 2012/0093154) to Rosenberg, et al., entitled "Methods and Apparatus to Utilize Route Parameter Sets for Exchanging Routes in a Communication Network," and filed on the same date as the instant application, which is hereby incorporated by reference in its entirety. In such examples, one or more of the example methods and/or apparatus disclosed herein can be used to aggregate multiple individual routes (e.g., having different individual route identifiers/prefixes, but similar route parameter values) into an aggregate route characterized by a single, aggregate route identifier (e.g., aggregate route prefix) and a single collection of aggregate route parameter values. The aggregate route can be further characterized by an absentee list specifying one or more route identifiers for a respective one or more individual routes not to be included in the aggregate route, and/or an exception matrix specifying one or more individual route identifiers for a respective one or more individual routes having one or more individual route parameter values not included in (e.g., different from) the plurality of aggregate route parameter values. One or more of the example method and/or apparatus disclosed in U.S. patent application Ser. No. 12/907,232, which also corresponds to U.S. Patent Publication No. 2012/0093154) can then be used to send (e.g., forward) the aggregate route (e.g., including the collection of aggregate route parameter values, the absentee list and/or the exception matrix) to a recipient using a pointer to a known route parameter set as described therein, instead of sending each aggregate route parameter value separately.

Figure 9:
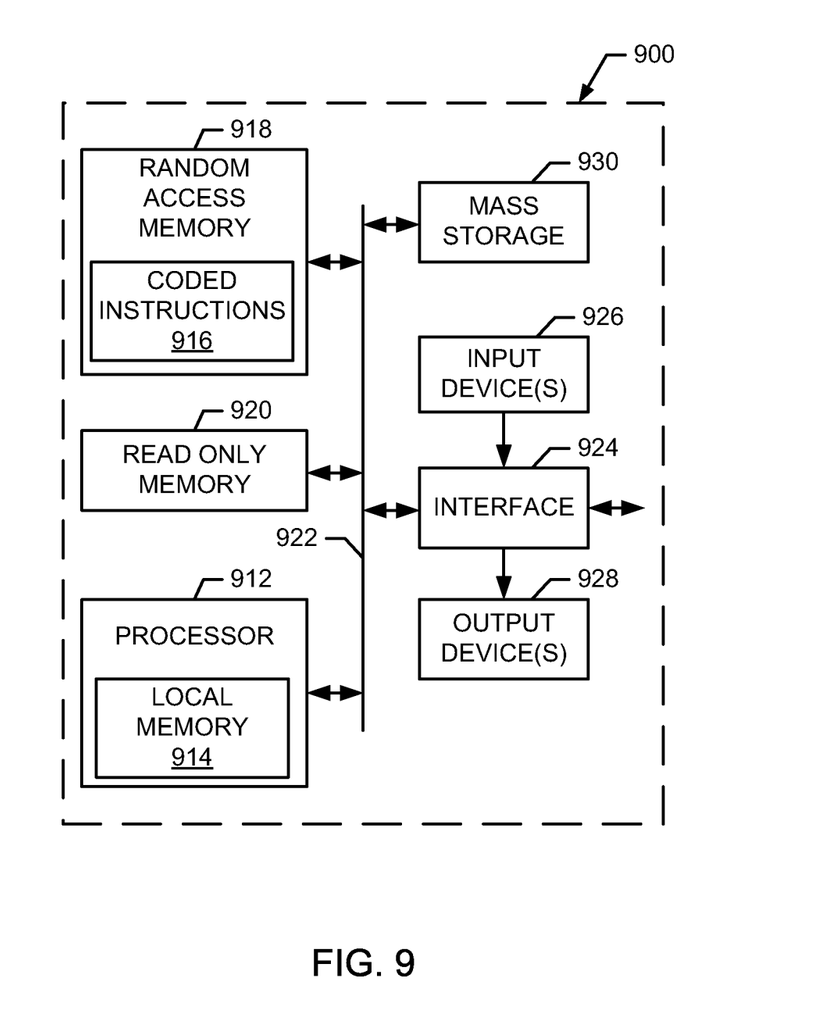
FIG. 9 is a block diagram of an example processing system that may execute the example machine readable instructions of FIGS. 6-8 to implement the route advertiser of FIG. 2 and/or the service provider network of FIG. 1.

FIG. 9 is a block diagram of an example processing system 900 capable of implementing the apparatus and methods disclosed herein. The processing system 900 can be, for example, a server, a personal computer, a personal digital assistant (PDA), an Internet appliance, a DVD player, a CD player, a digital video recorder, a personal video recorder, a set top box, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 6-8. The processor 912 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The processing system 900 also includes an interface circuit 924. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 900 also includes one or more mass storage devices 930 for storing software and data. Examples of such mass storage devices 930 include floppy disk drives, hard drive disks, compact disk drives and digital versatile disk (DVD) drives. The mass storage device 930 may implement the route storage 210. Alternatively, the volatile memory 918 may implement the route storage 210.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to exchange routes in a communication network, the method comprising:
   aggregating, using a processor, a plurality of individual routes into an aggregate route characterized by an aggregate route identifier and a plurality of aggregate route parameter values, the plurality of individual routes comprising a respective plurality of individual route identifiers and respective pluralities of individual route parameter values, the aggregate route identifier to represent an aggregation of the plurality of individual route identifiers, the plurality of aggregate route parameter values to match at least some of the pluralities of individual route parameter values for at least some of the plurality of individual routes;
   determining, using the processor, an exception matrix including respective first and second individual route identifiers for respective first and second individual routes included in the aggregate route but having respective different first and second individual route parameter values not included in the plurality of aggregate route parameter values;
   determining an absentee list specifying a third individual route identifier subsumed in the aggregate route identifier but associated with a respective route to be disregarded by the recipient; and
   sending the aggregate route identifier, the plurality of aggregate route parameter values, the absentee list and the exception matrix to a recipient in the communication network to forward the plurality of individual routes to the recipient.

2. The method as defined in claim 1 wherein the plurality of individual route identifiers comprise a plurality of individual route prefixes, and the aggregate route identifier comprises an aggregate route prefix comprising a set of higher-order bits common to the plurality of individual route prefixes.

3. The method as defined in claim 1 wherein the exception matrix further includes the respective different first and second individual route parameter values.

4. The method as defined in claim 1 further comprising sending the absentee list and the exception matrix as an attribute of a border gateway protocol update message.

5. The method as defined in claim 1 further comprising:
   receiving the aggregate route;
   disaggregating the aggregate route into a plurality of disaggregated individual routes, each disaggregated individual route having a respective route identifier subsumed in the aggregate route identifier; and
   revising the plurality of disaggregated individual routes based on the absentee list and the exception matrix to determine the plurality of individual routes being exchanged using the aggregate route.

6. The method as defined in claim 1 further comprising sending the aggregate route identifier and the plurality of aggregate route parameter values as an attribute of a border gateway protocol update message.

7. The method as defined in claim 1 further comprising sending an aggregation flag to indicate that the aggregate route identifier and the plurality of aggregate route parameter values represent the aggregate route and not an individual route.

8. The method as defined in claim 1 further comprising aggregating the plurality of individual routes into a plurality of aggregate routes characterized by a respective plurality of aggregate route identifiers and respective pluralities of aggregate route parameter values.

9. A tangible machine readable storage medium comprising machine readable instructions which, when executed, cause a machine to perform operations comprising:
   aggregating a plurality of individual routes into an aggregate route characterized by an aggregate route identifier and a plurality of aggregate route parameter values, the plurality of individual routes comprising a respective plurality of individual route identifiers and respective pluralities of individual route parameter values, the aggregate route identifier to represent an aggregation of the plurality of individual route identifiers, the plurality of aggregate route parameter values to match at least some of the pluralities of individual route parameter values for at least some of the plurality of individual routes;
   determining an exception matrix including respective first and second individual route identifiers for respective first and second individual routes included in the aggregate route but having respective different first and second individual route parameter values not included in the plurality of aggregate route parameter values;
   determining an absentee list specifying a third individual route identifier subsumed in the aggregate route identifier but associated with a respective route to be disregarded by the recipient; and
   sending the aggregate route identifier, the plurality of aggregate route parameter values, the absentee list and the exception matrix to a recipient in the communication network to forward the plurality of individual routes to the recipient.

10. The tangible machine readable storage medium as defined in claim 9 wherein the plurality of individual route identifiers comprise a plurality of individual route prefixes, and the aggregate route identifier comprises an aggregate route prefix comprising a set of higher-order bits common to the plurality of individual route prefixes.

11. The tangible machine readable storage medium as defined in claim 9 wherein the operations further comprise sending an aggregation flag to indicate that the aggregate route identifier and the plurality of aggregate route parameter values represent the aggregate route and not an individual route.

12. The tangible machine readable storage medium as defined in claim 9 wherein the exception matrix further includes the respective different first and second individual route parameter values.

13. An apparatus comprising:
   a memory having machine readable instructions stored thereon; and
   a processor to execute the instructions to perform operations comprising:
      aggregating a plurality of individual routes into an aggregate route characterized by an aggregate route identifier and a plurality of aggregate route parameter values, the plurality of individual routes comprising a respective plurality of individual route identifiers and respective pluralities of individual route parameter values, the aggregate route identifier to represent an aggregation of the plurality of individual route identifiers, the plurality of aggregate route parameter values to match at least some of the pluralities of individual route parameter values for at least some of the plurality of individual routes;

determining an exception matrix including respective first and second individual route identifiers for respective first and second individual routes included in the aggregate route but having respective different first and second individual route parameter values not included in the plurality of aggregate route parameter values;

determining an absentee list specifying a third individual route identifier subsumed in the aggregate route identifier but associated with a respective route to be disregarded by the recipient; and sending the aggregate route identifier, the plurality of aggregate route parameter values, the absentee list and the exception matrix to a recipient in a communication network to forward the plurality of individual routes to the recipient.

14. The apparatus as defined in claim 13 wherein the operations further comprise:
   identifying the third individual route identifier subsumed in the aggregate route identifier but associated with a respective route to be disregarded by the recipient.

15. The apparatus as defined in claim 13 wherein the operations further comprise sending the absentee list and the exception matrix as an attribute of a border gateway protocol update message.

16. The apparatus as defined in claim 13 wherein the operations further comprise sending the aggregate route identifier and the plurality of aggregate route parameter values as an attribute of a border gateway protocol update message.

17. The apparatus as defined in claim 13 wherein the operations further comprise sending an aggregation flag to indicate that the aggregate route identifier and the plurality of aggregate route parameter values represent the aggregate route and not an individual route.

18. The apparatus as defined in claim 13 wherein the exception matrix further includes the respective different first and second individual route parameter values.

* * * * *